Jan. 5, 1937.  W. SHAKESPEARE, JR  2,067,067
FISHING REEL
Filed Jan. 15, 1936  2 Sheets-Sheet 1
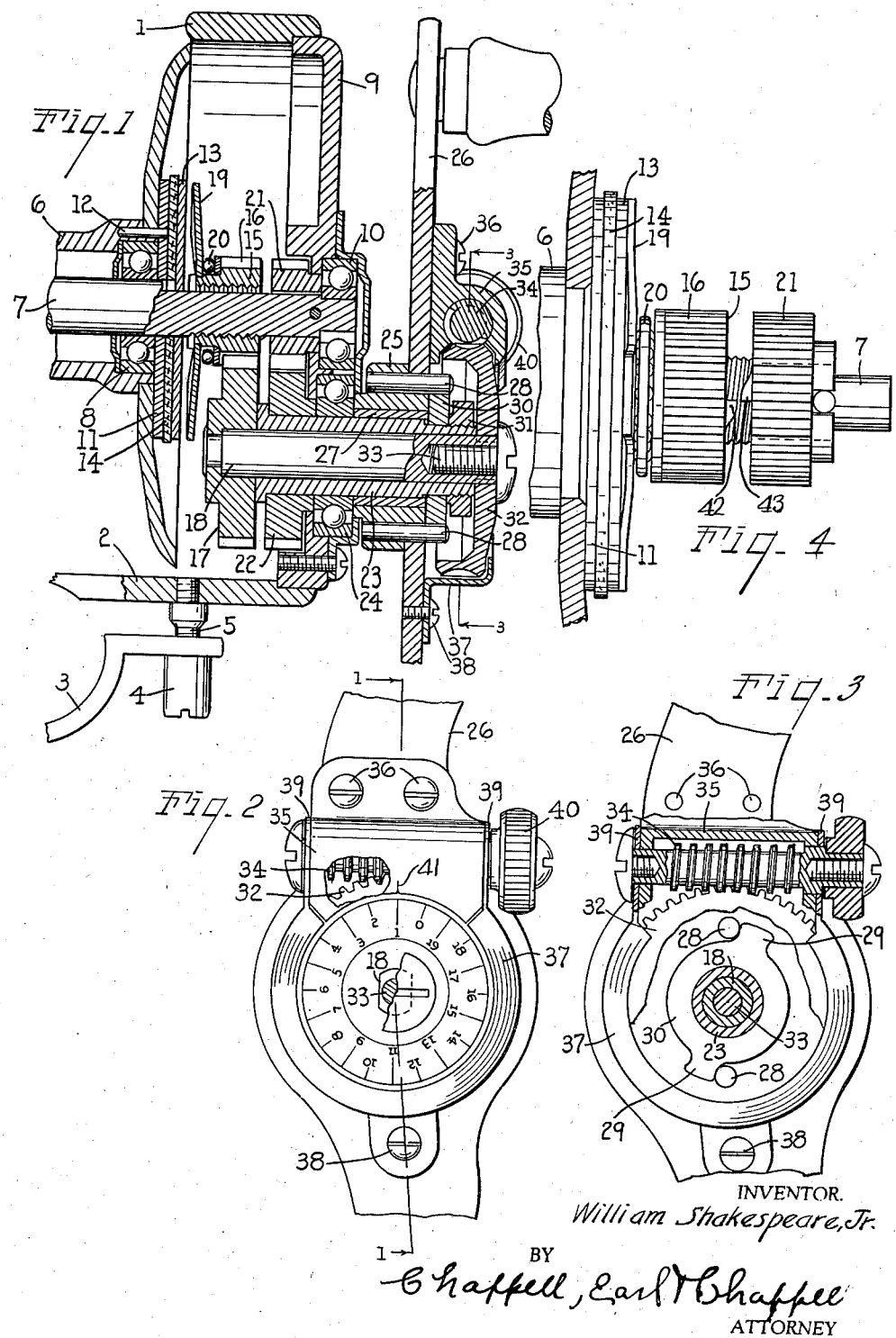
INVENTOR.
William Shakespeare, Jr.
BY
Chappell, Earl Chappell
ATTORNEY

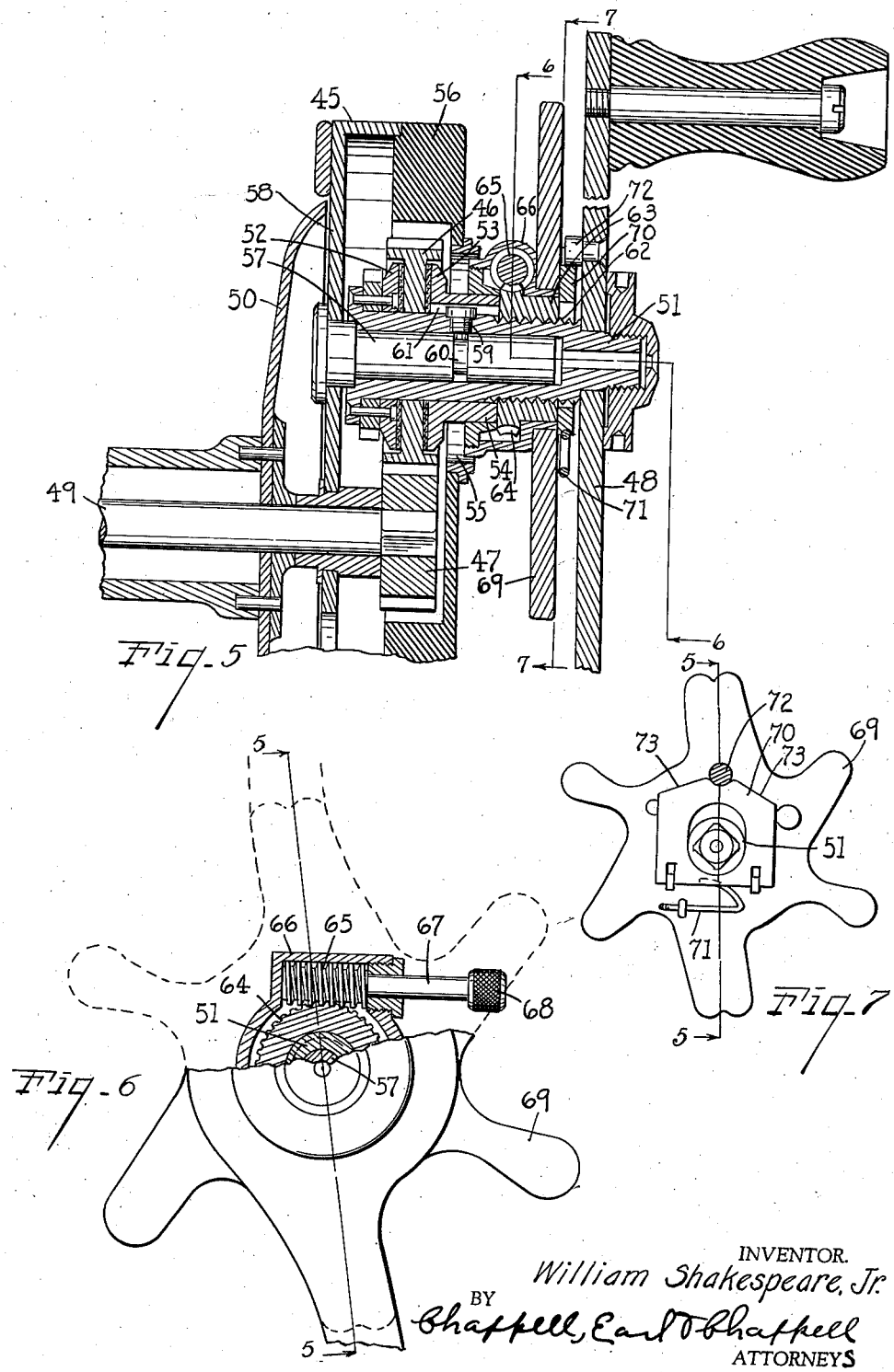

Patented Jan. 5, 1937

2,067,067

UNITED STATES PATENT OFFICE 2,067,067

FISHING REEL

William Shakespeare, Jr., Kalamazoo, Mich., assignor to Shakespeare Company, Kalamazoo, Mich.

Application January 15, 1936, Serial No. 59,206

19 Claims. (Cl. 242—84.5)

The main objects of this invention are:

First, to provide a fishing reel having an improved combined clutch and brake in which the braking action may be very quickly and accurately adjusted.

Second, to provide a fishing reel having these advantages of accurate adjustment in which the adjusting means is self-locking.

Third, to provide a fishing reel having improved combined clutch and braking means in which the clutch and brake means are controlled through the crank.

Fourth, to provide a fishing reel of the type described which is very simple in operation and effective for the purpose for which it is intended.

Objects relating to details and economies of my invention will appear from the description to follow. The invention is defined in the claims.

A preferred embodiment of my invention is illustrated in the accompanying drawings, in which:

Fig. 1 is a fragmentary sectional view in elevation taken on the line 1—1 of Fig. 2.

Fig. 2 is a side view partially broken away, illustrating the adjusting mechanism of my improved reel.

Fig. 3 is a fragmentary sectional view similar to Fig. 2, taken on the line 3—3 of Fig. 1.

Fig. 4 is an enlarged fragmentary elevational view illustrating details of my device.

Fig. 5 is an enlarged fragmentary view of a modified form or embodiment of my invention taken on a line corresponding to line 5—5 of Figs. 6 and 7.

Fig. 6 is a detail view partially in section on a line corresponding to line 6—6 of Fig. 5.

Fig. 7 is a fragmentary view partially in section on line 7—7 of Fig. 5.

In Figs. 1 to 4 inclusive, I have shown my invention as embodied in a combined braking and clutching means of the type illustrated in Letters Patent No. 1,991,407 to Ralph W. Miller and Samuel G. Russell dated February 19, 1935 in which the combined clutch and brake is actuated or disengaged by manipulation of the crank.

In the embodiment of my invention shown in Figs. 5 to 7 inclusive, the engaging and disengaging of the combined clutch and brake is through an independently manually manipulated member, that illustrated being of the star-wheel type.

Referring to the drawings, I show a frame end member 1 which is connected to a corresponding end member on the other side of the reel by pillars or cross pieces, one of which is indicated at 2. Means for clamping the reel to a fishing rod or pole is provided in the form of a clamp 3 cooperating with the pillar 2 and adjustable with respect thereto by nuts 4 threaded on studs 5 secured to the pillar.

A spool 6 is rotatably mounted on a spool shaft 7 by means of a ball bearing 8, and the shaft is rotatably journaled in the head plate 9 of the reel in a ball bearing 10. The spool 6 is provided with a friction plate 11 secured thereto by pins 12, the plate being arranged to surround the shaft 7. A friction clutch member 13 is splined to the shaft 7 for coaction with the friction plate 11, there being a friction disk 14 interposed between the plate 11 and clutch member 13. The disk 14 is preferably formed of material such as bakelite or other suitable material. At the side of the member 13 opposite the spool, I loosely thread on the shaft 7 a traveling clutch actuating member or nut 15 which is provided with gear teeth 16 meshing with the teeth of a gear 17 mounted on a control spindle 18. A spring thrust member or spider 19 is rotatably mounted on the inner end of the clutch actuating member 15, there being a roller thrust bearing 20 interposed between the members, as illustrated in Fig. 1. The spring thrust member 19 coacts with the friction clutch member 13 to establish a clutch and brake connection between the spool 6 and its shaft 7 when the traveling actuating member or nut 15 is advanced longitudinaly of the shaft 7 to a position to secure the desired amount of clutch or braking action. The spool shaft 7 is provided with a driving pinion 21 meshing with a driving gear 22 which is mounted on the inner end of a sleeve or tubular shaft 23 which is in turn rotatably mounted in the head plate 9 by means of ball bearing 24 as shown. The control spindle 18 is rotatably mounted in the sleeve 23.

The hub 25 of the manually operated crank 26 is rotatably carried on a bushing 27 on the sleeve 23, the crank 26 being keyed to its hub 25 by means of a pair of spaced pins 28 having their ends projecting outwardly for coaction with a pair of opposed radial driving lugs 29 of a disk 30 which is secured to the outer end of the sleeve 23 by means of a nut 31. The lugs 29 and pins 28 thus coact to provide a lost motion connection between the crank 26 and its shaft or sleeve 23. In the example illustrated, this lost motion is approximately 180° or a half turn of the crank 26, this being sufficient to cause the clutch actuating member or nut 15 to travel the length of its stroke. The above described mechanism is similar to that shown in the patent to Miller and Russell No. 1,991,407, dated February 19, 1935, referred to above. It will be understood that my reel is provided with further mechanism at the opposite end of the shaft 7 not herein shown or described, such as is shown and described in detail in that patent. I have confined the disclosure of the present application to the head end member of the reel inasmuch as it is on that end that the improvements constituting my invention are provided, which improvements will now be fully described.

The spindle 18 carries at the end thereof opposite the pinion 17 a worm wheel 32 secured thereto by a screw 33, the worm wheel for the sake of compactness and weight being constructed in the hollow shape shown in Fig. 1. A worm 34 meshes with the teeth of the worm wheel 32, being carried in a casing 35 secured to the crank 26 by screws 36. The casing 35 encloses or overhangs a portion of the worm wheel 32, as illustrated in Figs. 1 and 2, and the remainder of the periphery of the worm wheel is encased by flanged housing member 37 secured to the crank 26 at 38 and having its ends 39 brought up against the ends of the casing 35 as illustrated in Figs. 2 and 3. The worm 34 carries at one end thereof a knurled adjusting finger piece 40 which is clamped to the shaft of the worm. The worm 34 is journaled for free rotation in the casing 35 in the manner indicated in Fig. 3.

In order to facilitate the accurate adjustment of the clutch plate, the worm wheel 32 has formed on the outer face thereof a calibrated scale, and the casing 35 is notched at 41 to provide a pointer or locating member for cooperation with the scale, whereby the extent of adjustment of the clutch may be readily visually determined. By the above construction, the forward rotation or line winding rotation of the crank tightens or sets the clutch by frictionally connecting the spool shaft 7 to the spool 6, the amount of friction being determined by the adjustment of the worm wheel 32 and through the clutch actuating member or nut 15. The clutch actuating member is prevented from winding or locking with the pinion 21 by the coacting stops 42 and 43 formed respectively thereon. These stops act to limit the movement of the nut of the member 15 toward the pinion 21 and thereby prevent these parts from being locked together.

With the parts thus arranged, the amount of friction or drag may be readily controlled by manipulation of the convenient finger piece 40. In adjusted position, the worm and worm wheel are self-locking, wherefore the necessity of making additional manual locking provisions is eliminated. A very fine degree of adjustment may likewise be attained.

In the embodiment of my invention shown in Figs. 5, 6 and 7, the reel frame head member 45 is chambered to provide a housing for the gears 46 and 47 connecting the crank 48 to the shaft 49 of the spool 50. The pinion or gear 47 is mounted on the spool shaft while the gear 46 is connected to the shaft 51 through a combined clutch and brake mechanism consisting of a clutch brake 52 secured to the shaft, the gear being rotatable on the shaft and a clutch member 53 engaging the opposite side of the web of the gear. These clutch members are provided with suitable facings or friction surfaces. The clutch member 53 is sleeved for longitudinal adjustment upon the shaft 51, the clutch member 53 being provided with a hub or sleeve-like portion 54 projecting outwardly through the opening 55, this opening being provided with a liner as in the embodiment illustrated. The head plate 56 is formed of some non-metallic material as hard rubber, bakelite, or the like.

The shaft 51 is supported on the spindle 57 projecting from the inner head plate 58. A screw 59 through the shaft engages the annular groove 60 in the spindle for retaining the crank shaft upon the spindle. The head of this screw engages a longitudinal internal groove 61 within the hub or sleeve of the clutch member 53. With the clutch members in engaged or actuated position, the spool is connected to the crank with a friction drive, the adjustment of the clutch determining the amount of braking action, as in the embodiment shown in Figs. 1 to 4 inclusive.

In this embodiment, Figs. 5, 6 and 7, I also employ a worm and thread adjusting means for the combined clutch and brake which is not only self-locking but enables a substantially micrometer adjustment for the brake and clutch—that is, a very fine degree of adjustment is possible. To accomplish this, the shaft 51 is threaded at 62. The adjusting member 63 which in general corresponds to the adjusting member 15 is threaded upon the shaft and is provided with a worm pinion 64 with which the adjusting worm 65 coacts, this adjusting worm being carried in a housing 66 and is provided with a projecting stem portion 67 terminating in a knurled finger piece 68. The clutch is applied or released by means of the manually adjusted star-wheel 69 mounted upon the housing 66 at the inside of the crank. By rotative adjustment of this star-wheel, the points of which are shaped not only for convenient grasping but to indicate to the operator the position of the member, the clutch may be quickly applied and released and by manipulation of the worm 65, the degree of clutching and braking action may be very accurately varied or adjusted.

My improvements in both embodiments are especially designed by me for deep sea fishing—that is, for heavy work, and it is very desirable to provide means for the accurate adjustment of the braking action in order to minimize breaking of the line and it is also desirable to provide means for quick releasing of the brake or clutch.

In the embodiment shown in Figs. 1 to 4, the releasing and engagement of the clutch is done entirely through the manipulation of the crank but in this embodiment it is through manipulation of the star-wheel 69.

To hold the parts in their "on" and "off" position, and also to indicate the position to the operator, I provide a detent 70 which is slidably mounted between the crank and the adjusting member 69, being carried by the adjusting member and yieldingly supported by the spring 71 in coacting relation to the stop 72 on the inside of the crank. When the adjusting member is forcibly turned, the detent yields to disengage it from the stop 72 and allows it to slide down on one of the inclined surfaces 73. With this arrangement of parts, the clutching and braking action may be very accurately adjusted to meet varying conditions.

I have not attempted to illustrate or describe other embodiments or adaptations of my improvements as it is believed that this disclosure will enable those skilled in the art to embody or adapt my improvements as may be desired.

Having thus described my invention, what I claim as new and desire to secure by Letters Patent, is:

1. In a fishing reel, the combination with a frame and spool, of a driving means for said spool including a combined friction clutch and brake, a crank having lost motion driving connection with said combined friction clutch and brake, means for controlling said combined friction clutch and brake operatively associated with said crank to be actuated during the lost motion movement of the crank relative to its said driving connection to said clutch and brake, and means for adjusting the braking action comprising an adjusting worm pinion and a coacting worm on said crank provided with a finger piece, said worm pinion being provided with indicia indicating the adjustment thereof.

2. In a fishing reel, the combination with a frame and spool, of a driving means for said spool including a combined friction clutch and brake, a crank having lost motion driving connection with said combined friction clutch and brake, means for controlling said combined friction clutch and brake operatively associated with said crank to be actuated during the lost motion movement of the crank relative to its said driving connection to said clutch and brake, and means for adjusting the braking action comprising an adjusting worm pinion and a coacting manually adjustable worm on said crank.

3. In a fishing reel, the combination with a frame and spool, of a driving means for said spool including a combined friction clutch and brake, a crank having lost motion driving connection with said combined friction clutch and brake, means for controlling said combined friction clutch and brake operatively associated with said crank to be actuated during the lost motion movement of the crank relative to its said driving connection to said clutch and brake, and means for adjusting the braking action comprising an adjusting pinion and a coacting manually adjustable member, said pinion being provided with indicia indicating the adjustment thereof.

4. In a fishing reel, the combination of a rotatable spool, and a rotatable shaft, coacting clutch members on said spool and shaft, the clutch member on said shaft being mounted thereon for threaded adjustment, a crank having a lost motion driving connection with said shaft, means for adjusting said clutch member on said shaft comprising a spindle having driving connection with said clutch member on said shaft, an adjusting means for said clutch member on said shaft comprising a worm pinion on said spindle, and a coacting manually adjustable worm on said crank.

5. In a fishing reel, a frame, a spool shaft rotatably mounted on said frame, a clutch actuating member threaded on said spool shaft, a spindle rotatably mounted in said frame and operatively connected to said actuating member, a worm wheel on said spindle, means for actuating said spool shaft comprising a crank, and means carried by the crank to adjust the actuating member longitudinally and comprising a worm in mesh with said worm wheel and manual means for rotating said worm, said worm wheel having a calibrated scale thereon whereby the extent of adjustment may be determined.

6. In a fishing reel, a frame, a spool shaft rotatably mounted on said frame, a clutch actuating member threaded on said spool shaft, a spindle rotatably mounted in said frame, a worm wheel on said spindle, means for actuating said spool shaft comprising a crank, and means carried by the crank to adjust the said actuating member longitudinally and comprising a worm in mesh with said worm wheel and manual means for rotating said worm, said worm wheel having a calibrated scale thereon whereby the extent of adjustment may be determined.

7. In a fishing reel, a frame, a spool shaft rotatably mounted on said frame, a spool on said shaft, clutch members on said shaft, a clutch actuating toothed member rotatable and axially shiftable on said spool shaft, a spring thrust member on said toothed member, a spindle rotatably mounted in said frame, means for actuating said spool shaft comprising a crank, and self-locking means carried by the crank to actuate said spindle to adjust the thrust member longitudinally.

8. In a fishing reel, a rotatable spool, a spool shaft on which said spool is mounted, clutch means shiftable longitudinally of said shaft to place said spool and shaft into and out of driving relation, and self-locking means for adjusting the axial position of said means, comprising a pinion meshing therewith and a worm and worm wheel adapted to rotate said pinion, and means on said worm wheel to visually indicate the extent of adjustment.

9. In a fishing reel, a rotatable spool, a spool shaft on which said spool is mounted, clutch means shiftable longitudinally of said shaft to place said spool and shaft into and out of driving relation, and self-locking means for adjusting the axial position of said means, comprising a worm and worm wheel, and means on said worm wheel to visually indicate the extent of adjustment.

10. In a fishing reel, a rotatable spool, a spool shaft on which said spool is mounted, clutch means shiftable longitudinally of said shaft to place said spool and shaft into and out of driving relation, and self-locking means for adjusting the axial position of said means, comprising a worm and worm wheel.

11. In a fishing reel, a rotatable spool, a spool shaft on which said spool is mounted, toothed clutch means shiftable longitudinally of said shaft to place said spool and shaft into and out of driving relation, means for adjusting the axial position of said means, comprising a pinion meshing therewith and a worm and worm wheel adapted to rotate said pinion, and means to visually indicate the extent of adjustment.

12. A fishing reel comprising a spool, a crank, connecting gears for said crank and spool, a combined friction clutch and brake operatively associated with said gears and crank, means for adjusting said combined clutch and brake to vary the frictional engagement thereof including a threaded member operatively associated therewith, a worm pinion operatively associated with said threaded member, a coacting adjusting worm, and manually operated means for applying and releasing said combined clutch and brake.

13. A fishing reel comprising a spool, a crank, connecting gears for said crank and spool, a combined friction clutch and brake operatively associated with said gears and crank, means for adjusting said combined clutch and brake to vary the frictional engagement thereof including a threaded member operatively associated therewith, a worm pinion operatively associated with said threaded member, and a coacting adjusting worm.

14. In a fishing reel, the combination with a frame and spool, of a crank, connecting gears for said crank and spool, said gears having a combined friction clutch and brake operatively associated therewith, means for adjusting said combined clutch and brake to vary the frictional engagement thereof including a threaded member, a worm pinion connected to said threaded member, a coacting manually adjustable worm, and manually operated means for applying and releasing said combined clutch and brake.

15. In a fishing reel, the combination with a frame and spool, of a crank, connecting gears for said crank and spool, said gears having a combined friction clutch and brake operatively associated therewith, means for adjusting said combined clutch and brake to vary the frictional engagement thereof including a threaded member, a worm pinion connected to said threaded member, and a coacting manually adjustable worm.

16. In a fishing reel, the combination with a frame and spool, of a crank, driving connections for said crank to said spool including a combined friction clutch and brake, a threaded adjusting member for said combined clutch and brake, means for adjusting said adjusting member comprising a worm pinion operatively connected to said adjusting member, and a manually adjustable worm coacting with said pinion, and means for applying and releasing said combined clutch and brake.

17. In a fishing reel, the combination with a frame and spool, of a crank, driving connections for said crank to said spool including a combined friction clutch and brake, a threaded adjusting member for said combined clutch and brake, means for adjusting said adjusting member comprising a worm pinion operatively connected to said adjusting member, and a manually adjustable worm coacting with said pinion.

18. In a fishing reel, the combination with a frame and spool, of a crank, driving means for said crank to said spool including a combined friction clutch and brake, an adjusting member for said combined clutch and brake, means for adjusting said adjusting member comprising a worm pinion operatively associated with said adjusting member, and a coacting manually adjustable worm.

19. A fishing reel comprising a spool and a crank, of driving connections for said crank and spool including a combined friction clutch and brake, a threaded adjusting member for said clutch, means for adjusting said adjusting member comprising a worm and a pinion, and means for applying and releasing said combined clutch and adjusting member.

WILLIAM SHAKESPEARE, Jr.